United States Patent
Bennett et al.

(10) Patent No.: US 8,541,135 B2
(45) Date of Patent: Sep. 24, 2013

(54) CURRENT COLLECTOR FOR CATALYTIC ELECTRODE

(75) Inventors: Wayne B. Bennett, Westlake, OH (US); Jingdong Guo, Westlake, OH (US)

(73) Assignee: Eveready Battery Co, Inc., St. Louis, MO (US)

( * ) Notice: Subject to any disclaimer, the term of this patent is extended or adjusted under 35 U.S.C. 154(b) by 483 days.

(21) Appl. No.: 12/791,042

(22) Filed: Jun. 1, 2010

(65) Prior Publication Data
US 2010/0304274 A1  Dec. 2, 2010

Related U.S. Application Data

(60) Provisional application No. 61/182,285, filed on May 29, 2009.

(51) Int. Cl.
*H01M 10/36* (2010.01)

(52) U.S. Cl.
USPC ............. 429/218.1; 429/218.2; 429/219; 429/220; 429/221; 429/222; 429/223; 429/224; 429/246

(58) Field of Classification Search
USPC ...................... 429/218.1–224, 246
See application file for complete search history.

(56) References Cited

U.S. PATENT DOCUMENTS

| | | | |
|---|---|---|---|
| 4,248,682 | A | 2/1981 | Lindstrom et al. |
| 4,865,925 | A | 9/1989 | Ludwig et al. |
| 6,120,940 | A | 9/2000 | Poehler et al. |
| 6,403,517 | B1 | 6/2002 | Eshraghi |
| 2002/0132158 | A1 | 9/2002 | Sassen |
| 2005/0221190 | A1 | 10/2005 | Sudano et al. |
| 2006/0204839 | A1 | 9/2006 | Richards et al. |
| 2008/0160413 | A1 | 7/2008 | Dopp et al. |
| 2008/0187824 | A1 | 8/2008 | Tomantschger |

FOREIGN PATENT DOCUMENTS

| | | |
|---|---|---|
| JP | 8264186 A | 10/1996 |
| JP | 2002 151086 A | 5/2002 |
| JP | 2002215086 A * | 7/2002 |
| WO | 00/36677 A1 | 6/2000 |
| WO | 0036686 A1 | 6/2000 |
| WO | WO 2006085691 A1 * | 8/2006 |

OTHER PUBLICATIONS

Machine Translation of JP 2002215086.*
Patent Cooperation Treaty (PCT), International Search Report and Written Opinion for Application No. PCT/US2010/036271, filed May 27, 2010, mailed Aug. 19, 2010, European Patent Office, Netherlands.

* cited by examiner

*Primary Examiner* — Christopher Schatz
(74) *Attorney, Agent, or Firm* — Russell H. Toye, Jr.

(57) ABSTRACT

The invention is an electrochemical cell with a catalytic electrode and an aqueous alkaline electrolyte within a cell housing having one or more ports for the passage of a gas to or from the catalytic electrode and a process for making the cell. The catalytic electrode includes a catalytic layer, containing a catalytic material, and a porous current collector, at least partially embedded in the catalytic layer. The current collector includes a substrate with an electrically conductive metal layer, in contact with the catalytic material on the side of the current collector facing the ports, and a coating including electrically conductive particles, in contact with the catalytic layer on the side facing the separator.

18 Claims, 2 Drawing Sheets

CURRENT COLLECTOR FOR CATALYTIC ELECTRODE

CROSS-REFERENCE TO RELATED APPLICATIONS

This application claims the benefit of U.S. Provisional Application No. 61/182,285, filed May 29, 2009, entitled Current Collector for Catalytic Electrode.

BACKGROUND

This invention relates to a current collector for a catalytic electrode and an electrochemical cell containing the electrode.

There is a variety of electrochemical cells that have catalytic electrodes. Examples include, but are not limited to, fuel cells, metal-air battery cells, gas (e.g., hydrogen) generating cells, and electrochemical sensor cells. Examples of such cells are found in U.S. Pat. Nos. 5,242,565; 5,308,711; 5,378,562; 5,567,538; 5,707,499; 6,060,196; 6,461,761; 6,602,629; 6,911,278; 7,001,689 and 7,001,865; and in International Patent Publication No. WO 00/36677.

An advantage of electrochemical cells with catalytic electrodes is that they can use one or more active materials that are not contained within cell or battery housings, thereby providing long use time (e.g., discharge capacity) with a cell having a minimum volume. For example, oxygen in the air or from another source outside the cell housing can be reduced by the catalytic electrode as part of the overall reaction of the cell. There is an ongoing desire to improve the performance of such electrochemical cells, such as by improving electrical characteristics (e.g., operating voltage, power output, energy density, discharge capacity, charging efficiency, cycle life and fade), storage characteristics, leakage resistance, cost, environmental impact of waste disposal, and safety in manufacturing.

The electrical characteristics of the electrochemical cell can be improved in a number of ways, including the use of a catalytic material having greater catalytic activity, increasing the electrical conductivity and reducing the internal resistance within the catalytic electrode. Catalytic electrodes can include an electrically conductive current collector in direct contact with the catalytic material of the electrode to reduce the internal resistance of the catalytic electrode. In the past various means have been used to minimize the internal resistance of the catalytic electrode, such as means of providing corrosion resistance of the surface of the current collector in contact with the catalytic electrode and means of providing good contact between the current collector and the catalytic portion of the electrode. For examples, the current collector surface can be coated with a metal, alloy or compound that is more corrosion resistant than the underlying substrate material, particularly when the current collector is in contact with the catalytic portion of the electrode and the cell's electrolyte. In another example, the current collector surface can be coated with particles of a conductive material such as carbon black, graphite or metal in a binder. Examples of these efforts can be found in International Patent Publication No. WO 00/36,686; U.S. Patent Publication Nos. 2006/0204839, 2005/0221190 and 2002/0132158; and in U.S. Pat. Nos. 6,403,517, 6,120,940, 4,865,925 and 4,248,682.

Previous attempts have not been completely successful in minimizing the internal resistance of catalytic electrodes and maximizing the electrical performance of cells in which those electrodes are used. Further improvement is desired, preferably in a manner that is cost effective and compatible with large scale manufacturing.

SUMMARY

Accordingly, one aspect of the present invention is an electrochemical cell including a catalytic electrode, a counter electrode, a separator disposed between the catalytic electrode and the counter electrode, and an aqueous alkaline electrolyte, all contained within a cell housing having one or more ports for the passage of a gas through the housing to or from the catalytic electrode. The catalytic electrode includes a first side facing the separator, a second side opposite the first side and in fluid communication with the one or more ports, a catalytic layer including a catalytic material capable of reducing oxygen, and a porous current collector at least partially embedded in the catalytic material. The current collector has a first side corresponding to the first side of the catalytic electrode and a second side corresponding to the second side of the catalytic electrode. The current collector includes a substrate with an electrically conductive protective metal surface layer in contact with the catalytic material on one of the first side and the second side and a coating including electrically conductive particles in contact with the catalytic material on the other of the first side and the second side.

The current collector can be at least partially embedded in the catalytic material on the first side of the catalytic electrode.

The protective metal surface layer can be in contact with the catalytic material on the second side of the current collector, with the coating in contact with the catalytic material on the first side of the current collector. The protective metal surface layer can be present on essentially the entire first side and essentially the entire second side of the current collector. The protective metal surface layer can be a distinct layer with a different composition than a portion of the substrate beneath the metal surface layer. The protective metal surface layer can include gold, platinum, palladium, silver or a combination thereof. In one embodiment the protective metal surface layer includes gold.

The coating can include a binder. The binder can include a polymeric material. The polymeric material can include a fluoropolymer, a polyvinyl alcohol or a combination thereof. In some embodiments the polymeric material includes a fluoropolymer, a polyvinyl alcohol or both a fluoropolymer and a polyvinyl alcohol.

The electrically conductive particles can include carbon particles, gold particles, nickel particles, silver particles or a combination thereof. In some embodiments the conductive particles include graphite particles, carbon black particles or a combination of graphite particles and carbon black particles.

The catalytic material can include a manganese oxide, an activated carbon, platinum, palladium, a cobalt oxide, a nickel oxide, an organic macrocyclic compound or a combination thereof. In some embodiments the catalytic material includes a manganese oxide, an activated carbon or a combination of a manganese oxide and an activated carbon.

The electrolyte can include potassium hydroxide, sodium hydroxide or a combination of potassium hydroxide and sodium hydroxide.

The catalytic electrode can be an oxygen reduction electrode for reducing oxygen from outside the cell housing. The cell can be a metal-air cell, the catalytic electrode is a positive electrode, and the counter electrode is a negative electrode comprising a metal as an active material. In one embodiment the active material of the negative electrode comprises zinc or an alloy of zinc. The cell can be a fuel cell.

A second aspect of the invention is a process for making an electrochemical cell comprising the steps: (a) forming a current collector sheet by providing a sheet of a porous, electrically conductive metal substrate having a first side and a second side opposite the first side, forming an electrically conductive protective metal surface layer on at least a portion of the substrate, and forming a coating comprising electrically conductive particles and a binder on a portion of the substrate; (b) forming a catalytic electrode sheet with a first side and a second side opposite the first side by combining the current collector sheet with a catalytic material comprising a binder and a catalyst capable of reducing oxygen such that the first side and second sides of the current collector correspond to the first and second sides, respectively, of the catalytic electrode sheet, the current collector is at least partially embedded in the catalytic material, at least a portion of the coating is on the first side of the current collector and is in contact with the catalytic material, and at least a portion of the electrically conductive protective metal surface layer of the substrate is in contact with the catalytic material on the second side of the current collector; (c) securing an oxygen diffusion layer comprising an oxygen permeable, electrolyte impermeable sheet to the second side of the catalytic electrode sheet; (d) combining at least a portion of the catalytic electrode sheet with a counter electrode and an aqueous alkaline electrolyte in a cell housing such that an electrically insulating, ion permeable separator is disposed between the first side of the catalytic electrode sheet and the counter electrode, and the oxygen diffusion layer is in fluid communication with a gas entry port in the cell housing through which a gas from outside the cell can enter the housing; and (e) sealing the cell housing to contain the catalytic electrode, the counter electrode and the electrolyte within the cell. The process for making an electrochemical cell can include one or more of the embodiments below.

The current collector sheet can combined with the catalytic material after the oxygen diffusion layer is secured to the second side of the catalytic electrode sheet. The current collector sheet can be combined with the catalytic material by pressing the current collector sheet into a catalytic sheet including the catalytic material.

The electrically conductive protective metal surface layer of the current collector sheet can be formed by plating a protective metal onto a surface of the substrate. The electrically conductive protective metal surface layer can extend over essentially the entire substrate sheet, or the electrically conductive protective metal surface layer can extend over only a portion of the substrate sheet.

The coating can be formed by applying the coating to one side of the substrate such that the protective metal surface layer of the current collector is exposed on at least a portion of an opposite side of the current collector.

The process according to the second aspect of the invention can be used to make the electrochemical cell according to the first aspect of the invention.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DESCRIPTION

Figure 1:
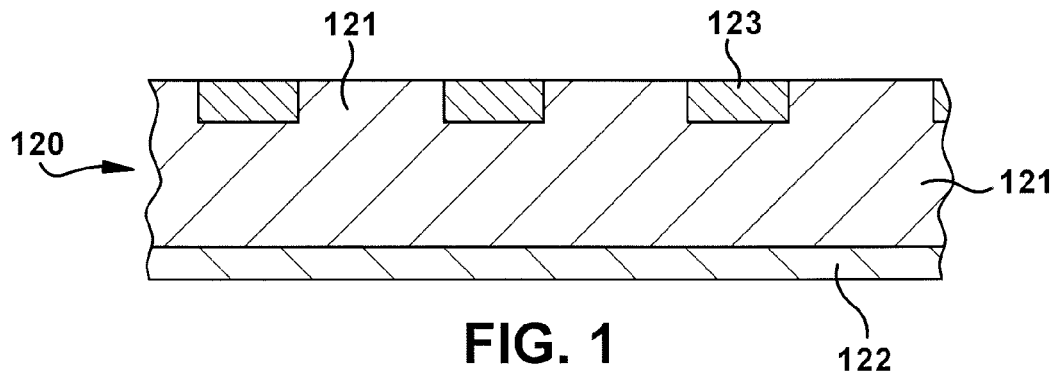
FIG. 1 is an elevational view, in cross-section, of a portion of a catalytic electrode according to one embodiment.

An electrochemical cell according to the present invention includes a catalytic electrode. In various embodiments the catalytic electrode can be an electrode in which a gas such as oxygen is reduced or a gas such as hydrogen or oxygen is produced. In one embodiment oxygen from an external source is used as an active material that is reduced by a catalytic material in the presence of an aqueous alkaline electrolyte. Examples include fuel cells, metal-air cells and air-assisted cells. In other embodiments oxygen, hydrogen or another gas can be generated at the catalytic electrode in the presence of an aqueous alkaline electrolyte. In yet another embodiment a cell with an oxygen reduction catalytic electrode and an aqueous alkaline electrolyte can be used as an oxygen sensor due to the current produced by the cell being proportional to the quantity of oxygen reaching the catalytic electrode.

A cell according to the invention includes a catalytic electrode, a counter electrode, a separator disposed between the catalytic electrode and the counter electrode and an aqueous alkaline electrolyte, all contained within a cell housing. The cell housing has at least one inlet/outlet port through which a gas can enter the cell and react within the catalytic electrode or through which a gas produced within the cell can exit the cell.

The catalytic electrode includes a catalytic layer and a porous current collector at least partially embedded in the catalytic layer. As used herein, embedded means that at least a portion of the current collector is disposed below a surface of the catalytic layer. The current collector can be embedded by any suitable process, such as by pressing the current collector into the catalytic layer or by forming the catalytic layer partially or completely around the current collector.

The catalytic layer includes a catalytic material containing a suitable catalyst capable of catalyzing reactions in the catalytic electrode in the presence of an aqueous alkaline electrolyte, such as the reduction of oxygen to produce hydroxyl ions or the oxidation of hydroxyl ions to produce oxygen. In some embodiments the catalytic material can include an electrically conductive material. In some embodiments the catalytic material can include a binder. In one embodiment particles of the catalyst are disposed on the surfaces of particles of a conductive material. Examples of catalysts include metal oxides such as manganese oxides, cobalt oxides and nickel oxides; carbons such as activated carbons and carbon blacks; metals such as platinum and palladium; and organic macrocyclic compounds such as cobalt tetramethoxyphenyl porphyrin and cobalt tetraphenyl porphyrin. Examples of conductive materials include carbons such as activated carbons, carbon blacks, graphitic carbons and carbon nanotubes. Examples of binder materials include fluoropolymers such as polytetrafluoroethylene (PTFE), fluorinated ethylene propylene (FEP) and polyvinylidene fluoride (PVDF). Further examples of catalysts, conductive materials and binders, as well as other materials and processes that can be used to make the catalytic layer and the catalytic electrode are disclosed in U.S. Patent Publication No. 2008/0155813. In some embodiments ultrasonic energy can be used in the mixing process used to make the catalytic layer to improve its uniformity.

One side of the catalytic electrode, referred to as the port side, faces away from the counter electrode and is in fluid communication with the gas inlet/outlet port(s) in the cell housing. The opposite side of the catalytic electrode, referred to as the separator side, is adjacent to the separator and faces toward the separator and the counter electrode. The current collector has an electrically conductive substrate and two opposite sides that, when embedded in the catalytic layer, correspond to the port side and the separator side of the catalytic electrode (i.e., the port side of the current collector is in fluid communication with the gas port(s), and the separator side of the current collector faces the separator and the counter electrode).

One side of the current collector has an electrically conductive, protective metal surface layer to provide resistance to corrosion when in contact with the electrolyte and good electrical contact with the catalytic material. At least a portion of the current collector has a coating including electrically conductive particles. Preferably essentially the entire separator side and essentially the entire port side of the current collector are covered by at least one of the protective metal surface layer and the coating. As used herein, essentially the entire side or essentially all of a side means the entire side except for possible pinholes, small voids, cracks and other common imperfections in manufacturing. In one embodiment essentially all of both the separator side and the port side of the current collector are covered by the protective metal surface layer, and a portion of the protective metal surface layer (e.g., the separator side or the port side) is covered by the coating. In another embodiment the protective metal surface layer does not cover the entire current collector, and at least those portions of the separator and port sides of the current collector that do not include the protective metal surface layer are covered by the coating. For example, the protective metal surface layer can be disposed over the entire port side and the entire separator side of the current collector, with a coating of electrically conductive particles applied to a major portion of the separator or the port side. In another example the protective metal surface layer does not extend under the entire area coated with the electrically conductive particles. In all embodiments the protective metal surface layer is exposed to the catalytic material and electrolyte on at least a portion of the separator, port or both sides of the current collector, and the coating is present and exposed to the catalytic material on at least a portion of at least one side of the current collector.

The port side of the catalytic electrode can have a hydrophobic gas diffusion layer that is permeable to gas but impermeable to liquid water, thereby preventing electrolyte leakage from the cell. The hydrophobic layer can be formed from a hydrophobic mixture, such as a mixture including a high concentration of a hydrophobic material such as a fluoropolymer, or it can be a microporous hydrophobic film. Examples of such films include fluoropolymer films such as polytetrafluoroethylene and fluorinated ethylene propylene films.

Figure 2:
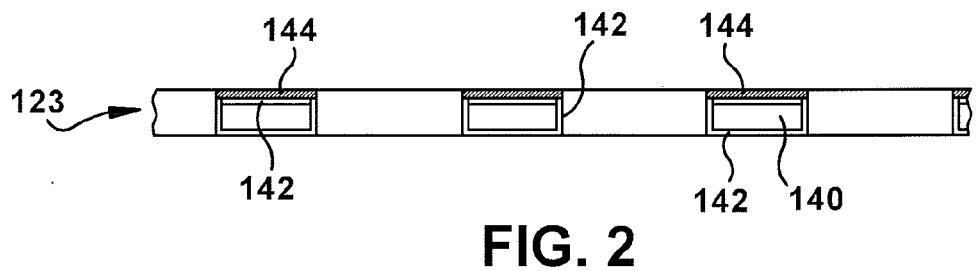
FIG. 2 is an elevational view, in cross-section, of an embodiment the current collector in the portion of the catalytic electrode embodiment shown in FIG. 1.

FIG. 1 is a cross-sectional view of a portion of a catalytic electrode. The electrode 120 has a catalytic layer 121 into which a current collector 123 is embedded. The electrode 120 can also include a gas diffusion layer 122 on the port (lower) side of the electrode 120. The upper side of the electrode 120 is the separator side. FIG. 2 is a cross-sectional view of an embodiment of the current collector 123 in the same orientation as in FIG. 1. The lower surface corresponds to the port side of the electrode 120, and the upper surface corresponds to the separator side of the electrode 120. The current collector 123 includes a substrate 140 with a layer 142 having a hydrogen overpotential higher than copper on both the port side and the separator side of the current collector. The current collector 123 also has a coating 144 of conductive particles over the layer 142 on the separator side of the current collector 123. In another embodiment (not shown), the layer 142 is primarily only on the port side of the current collector 123, and the coating 144 is primarily only on the separator side of the current collector.

The current collector substrate is a good electrical conductor. Suitable materials for the substrate include electrically conductive metals and metal alloys such as steel, stainless steel, nickel, copper, brass, tin, silver, gold, platinum, palladium and titanium. Metals such as steel, stainless steel, nickel, copper, brass and tin can be advantageous in some embodiments due to lower cost or ease of manufacture. Metals as gold, platinum and palladium can be advantageous in other embodiments because of their resistance to corrosion when in contact with the cell electrolyte. Other suitable substrate materials include electrically conductive metal oxides such as tin oxide and chromic oxide, and electrically conductive polymers such as polyaniline and polypyrrole. The substrate can have a core of one material covered with a layer of one or more suitable electrically conductive materials. In one embodiment the core is an electrically nonconductive material such as a plastic.

Ideally the current collector substrate would be an excellent conductor of electricity, completely inert when in contact with the catalytic material and electrolyte in the electrode, inexpensive and easy to manufacture. However, no single material has all of these ideal characteristics. If the substrate material has sufficient electrical conductivity and resistance to corrosion and dissolution, its surfaces are considered to constitute a protective layer, and no additional protective layer may be required. If improved electrical conductivity and/or further protection from corrosion and dissolution are desired, a separate protective metal surface layer can be applied to at least those portions of the port side and the separator side that will not be coated with the electrically conductive particles. Using a metal that can also serve as a catalyst for the desired reaction in the catalytic electrode can be advantageous. Preferred materials for the protective metal surface layer are gold, platinum, palladium and silver, with gold being the most preferred. Because the materials for this added layer can be expensive, it can be advantageous to make this layer very thin, yet thick enough to provide a continuous layer through which the underlying substrate is not exposed. Preferably the protective metal surface layer is at least 0.01 μm thick and more preferably at least 0.1 μm thick. Preferably the protective metal surface layer is no more than 100 μm thick and more preferably no more than 10 μm thick.

The current collector substrate can be further treated, such as by etching or sand blasting to roughen the surface, either before or after adding the protective layer, to minimize the electrical resistance between the current collector and the active material layer.

The current collector is a porous structure that will allow water and ions to pass therethrough. Examples of suitable structures include wires, filaments, nonwoven mats, woven screens and fabrics, expanded metals, foams, porous sintered structures and the like. Preferred structures are wires, filaments, screens and expanded metals. Screens and expanded metals can be advantageous because they can be easily handled and embedded into the catalytic layer of the electrode without damage. Examples of metal screens that can be used include woven wire cloths. The wires can be cross-bonded (welded where they cross). The screens can have 50 to 50 openings per inch with wire diameters of 0.10 to 0.15 mm. Such woven wire cloths are available from Gerard Daniel Worldwide, Fontana, Calif., USA. Expanded metals are of a one-piece structure. Sheet metal is slit and stretched at right angles to form an expanded metal lattice. The lattice typically has diamond shaped openings. The lattice has a Long Way of Diamond (LWD) dimension, measured across the long axis of the diamond, between centers of opposing metal joints between openings, and a Short Way of Diamond (SWD) dimension, measured across the short axis of the diamond, between centers of opposing metal joints between openings. In some embodiments expanded metals are preferred because they are sufficiently rigid to maintain good electrical contact with the cell housing at the periphery of the catalytic electrode and can have lower electrical resistance than woven screens because of their one-piece structure. Examples of expanded metals include expanded nickel, expanded nickel plated steel and expanded stainless steel.

Expanded metal material and dimensions can be selected to provide the desired strength, electrical resistance and open area. For example, increasing the base metal thickness and metal strand width between openings can reduce electrical resistance and increase strength but can increase the volume of the current collector, and the LWD and SWD dimensions can affect the current collector strength and adhesion of the catalytic material. In some embodiments the expanded metal can have a base metal thickness from 0.025 mm to 0.255 mm. The base metal thickness is preferably at least 0.050 mm and more preferably at least 0.075 mm. The base metal thickness is preferably no greater than 0.200 mm and more preferably no greater than 0.125 mm. In some embodiments the strand width can be from about 0.025 mm to about 0.255 mm. The strand width is preferably at least 0.075 mm and more preferably 15 least 0.100 mm. The strand width is preferably no greater than 0.200 mm and more preferably no greater than 0.150 mm. The openings in the expanded nickel can have 10 to 100 openings per inch, preferably 20 to 60 openings per inch. In some embodiments the LWD and SWD dimensions can each range from about 0.250 mm to about 13.00 mm. The LWD and SWD dimensions are preferably at least 0.500 mm and more preferably at least 1.00 mm. The LWD and SWD dimensions are preferably no greater than 5.00 mm and more preferably no greater than 3.175 mm. Expanded nickel is available as nickel EXMET® from Dexmet Corp., Naugatuck, Conn., USA; examples include 4 Ni 5-060 P&L and 3 Ni 3.3-05 EXMET®.

The coating of electrically conductive particles can include a binder to adhere the conductive particles to the substrate or protective metal surface layer. Suitable materials include fluoropolymers such as polytetrafluoroethylene (PTFE), fluorinated ethylene propylene (FEP) and polyvinylidene fluoride (PVDF); other polymers such as polyvinyl alcohol (PVA) and polyurethane (e.g., colloidal dispersed polyurethane); and combinations thereof. The particles in the coating can be particles of any electrically conductive material that will provide a rough surface and is relatively resistant to corrosion and dissolution when in contact with the catalytic material and electrolyte. Suitable materials include carbons such, as graphite and carbon black, and metals such as gold, tin, silver and nickel; carbons and gold are preferred, with graphite and carbon black being most preferred. Examples of suitable graphite coating materials that can be used include TIMREX® LB1000, LB1016 and LB1090 aqueous graphite dispersions (TIMCAL America, Westlake, Ohio, USA), ECCOCOAT® 257 (W. R. Grace & Co.), and ELECTRODAG® 109 and 112 and EB0005 (Acheson Industries, Port Huron, Mich., USA). The concentration of particles in the coating will be sufficient to provide good electrical conductivity between the catalytic layer and the current collector, and sufficient binder will be used to hold the particles together and adhere the coating to the current collector. Preferably the coating will contain at least 0.1 weight percent binder and more preferably at least 0.5 weight percent binder. Preferably the coating will contain no more than 5 weight percent binder and more preferably no more than 2 weight percent binder. The coating can be a continuous coating in the general area coated, or it can be a discontinuous coating if uncoated spots within the general area coated leave only the protective metal surface layer exposed.

If a separate protective metal surface layer is used, it can be applied by any suitable method. Examples include electroplating, electroless plating and vapor deposition (chemical or physical), sputtering and electroless plating. The coating of electrically conductive particles can be applied by any suitable method, such as painting, dipping, spraying, printing and application with a transfer pad.

The current collector and catalytic electrode can be used in electrochemical cells of various shapes, sizes and internal constructions. For example, the cell can be a button cell, a cylindrical cell, a prismatic cell or a flat cell. Depending on the configuration of the catalytic and counter electrodes, the size and shape of the current collector can vary.

The counter electrode can contain or use a variety of active materials, depending on the type of cell. For example, a fuel cell can use a different fluid from the gas used as the catalytic electrode (e.g., hydrogen, methanol or ethanol); and a metal-air cell, air-assisted cell, hydrogen generating cell or oxygen generating cell can use a metal such as zinc, lithium, aluminum or magnesium as an active material.

The aqueous alkaline electrolyte can contain a solute such as potassium hydroxide and/or sodium hydroxide in a water-based solvent. Various additives can also be included in the electrolyte, such gelling agents, performance enhancing materials such as zinc oxide, and indium compounds, surfactants and other materials to reduce the generation of gas from undesirable corrosion reactions.

Figure 3:
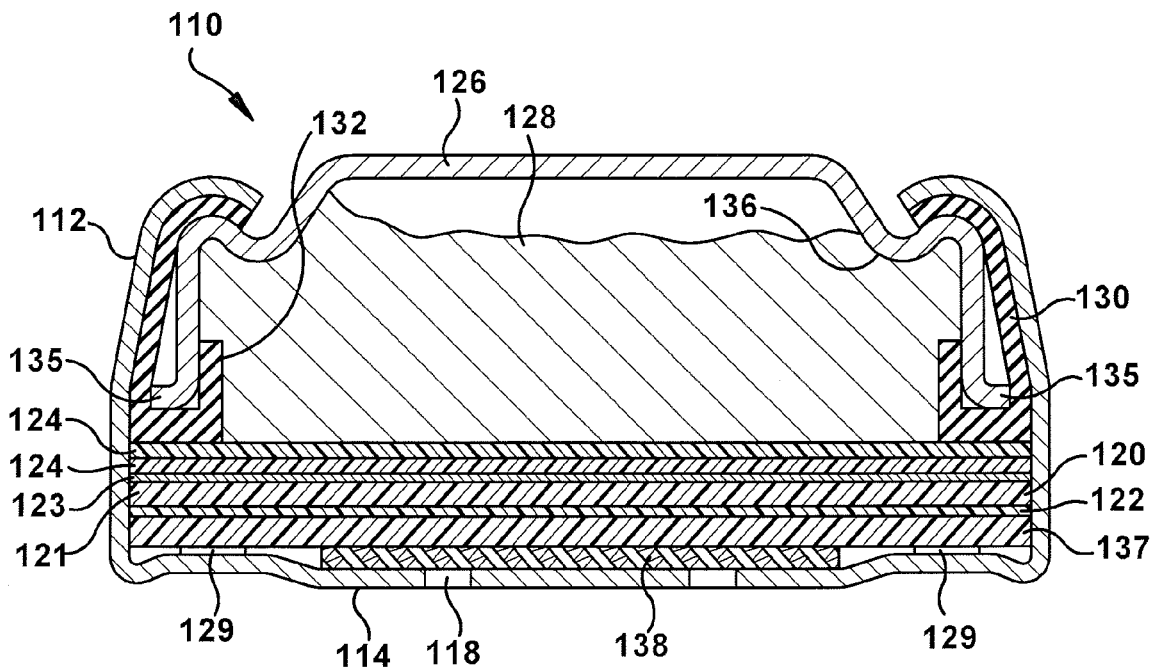
FIG. 3 is an elevational view, in cross-section, of a prismatic shaped metal-air cell with the catalytic electrode shown in part in FIG. 1.

FIG. 3 is a cross-sectional drawing of an embodiment in which the cell is a prismatic shaped metal-air cell with an aqueous alkaline electrolyte that has a counter electrode containing a metal as the negative electrode active material and a catalytic electrode, such as the embodiment in FIG. 1, that uses oxygen contained in the air from outside the cell as the positive electrode active material. The cell 110 includes a positive electrode (cathode) casing 112 and a negative electrode (anode) casing 126. At least one hole 118 is present in the bottom of cathode can 112 to act as an air entry port. The cathode casing is preferably formed of nickel-plated steel. The anode casing 126 has a rim 135 is flared outward at its open end. Alternatively, the anode casing can have essentially straight side walls and a rim with little or no outward flare, or can have a rim folded outward and back along the side wall to form a substantially U-shaped side wall with a rounded edge at the open end of the casing. The anode casing 126 can be formed from a single layer of material such as stainless steel, mild steel, cold rolled steel, aluminum, titanium or copper, or it can include one or more additional layers of material to provide good electrical contact to the exterior surface of the anode casing 126, resistance of the external surface to corrosion, and resistance to internal cell gassing where the internal surface of the anode casing 126 comes in contact with the anode 128 or electrolyte, such as a three-layered (triclad) material such as nickel/stainless steel/copper.

A catalytic positive electrode, such as air electrode 120 is disposed near the bottom of the cathode casing 112 of the cell 110. Electrode 120 includes a catalytic layer 121, which can contain a mixture of a conductive material such as a carbon, a catalyst, and a binder. Air electrode 120 preferably has a hydrophobic air diffusion layer 122, such as a hydrophobic membrane or film, which can be laminated thereon. The hydrophobic layer 122 is on the side of the air electrode closest to the bottom of the cell when oriented as shown in FIG. 3 (the port side of the electrode). Air electrode 120 also includes an electrically conductive current collector 123 as described above. The air electrode may also contain a barrier membrane 137, such as a PTFE film, between the hydrophobic layer 122 and a central region 114 of the bottom of the cathode casing 112. Examples of PTFE films that can be used include thermomechanically expanded PTFE membranes, such as EXCELLERATOR™ Gas Diffusion Membranes from W. L. Gore and Associates and TETRATEX™ PTFE membranes from Donaldson Membranes, and other microporous PTFE films, such as N6389A PTFE film from Performance Plastics Products (3P). Expanded films can provide higher gas transmission rates than non-expanded films. The catalytic positive electrode is separated from a negative electrode by a separator 124.

The cell 110 has a negative electrode that contains an anode mixture 128 including a metal such as zinc and an aqueous alkaline electrolyte containing potassium hydroxide and/or sodium hydroxide for example. The electrolyte and/or anode mixture can also contain additional ingredients such as zinc oxide and organic compounds. The anode mixture 128 preferably includes zinc powder, electrolyte solution, a binder such as CARBOPOL® 940, and gassing inhibitor(s) such as indium hydroxide ($In(OH)_3$) and DISPERBYK® D190 (an anionic polymer and is available from Byk Chemie of Wallingford, Conn.) and zinc oxide. Preferred zinc powders are low-gassing zinc compositions suitable for use in alkaline cells with no added mercury. Examples are disclosed in U.S. Pat. No. 6,602,629 (Guo et al.), U.S. Pat. No. 5,464,709 (Getz et al.) and U.S. Pat. No. 5,312,476 (Uemura et al.), which are hereby incorporated by reference. One example of a low-gassing zinc is ZCA grade 1230 zinc powder from Zinc Corporation of America, Monaca, Pa., USA, which is a zinc alloy containing about 400 to about 550 parts per million (ppm) of lead. Other examples of suitable zinc alloys include product grades NGBIA 100, NGBIA 115, and BIA available from N.V. Umicore, S.A., Brussels, Belgium.

Cell 110 also includes a gasket 130 made from an elastomeric material which serves as a seal between the cathode casing 112 and the anode casing 126. Optionally, a sealant may be applied to the sealing surface of the gasket, cathode casing and/or anode casing. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene.

A suitable tab (not shown) can be placed over the openings 118 and removed when the cell 110 is ready for use to keep air from entering the cell 110 before use.

The following examples illustrate the invention and its advantages.

Example 1

PP534 type prismatic air metal-air cells were made using air electrodes containing one of two different catalysts, with vs. without gold plated current collectors. All cells had a negative electrode containing zinc powder as the active material and an aqueous potassium hydroxide electrolyte. The cells in Lots A and B had a nano-manganese catalyst, and Lots C and D had a manganese oxide catalyst with a larger average particle size. The current collectors were made from 3 Ni 3.3-05P expanded metal; the current collectors in Lots A and C were not plated, and the current collectors in Lots B and D were plated with gold on essentially all of both the separator side and the port side of the expanded metal; and the current collectors were embedded into the separator sides of the catalytic layers.

Figure 4:
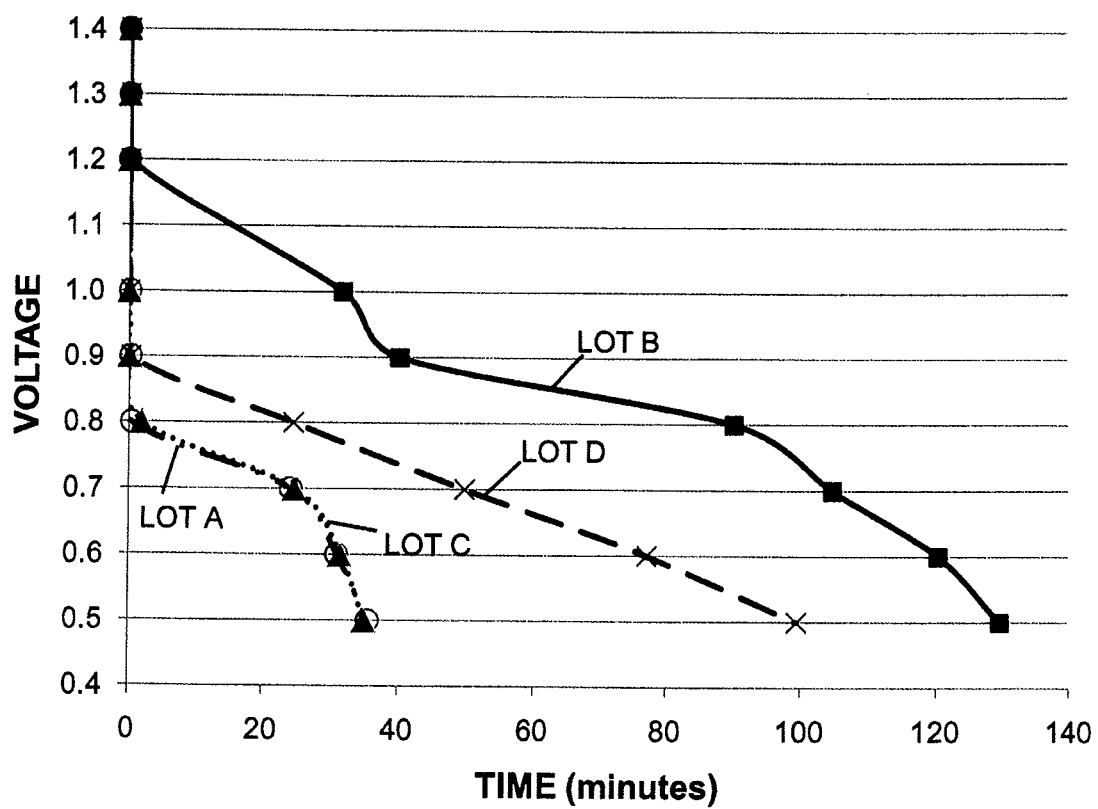
FIG. 4 is a graph showing discharge voltage as a function of time for zinc-air cells with current collectors plated with gold and unplated current collectors.

Cells were continuously discharged at a rate of 100 $mA/cm^2$, based on the surface area of the air electrode adjacent to the negative electrode. Discharge curves are plotted in FIG. 4, which shows that gold plating on the current collector increased the voltage for cells with both types of catalysts.

Although discharge performance was generally improved by plating the current collector with gold, relatively poor adhesion of the material in the catalytic layer to the gold plated current collectors was observed compared to the adhesion to the unplated current collectors. Poor adhesion was believed to cause higher internal resistance, thereby limiting cell discharge performance, especially on high rate discharge.

Example 2

The addition of a graphite coating to gold plated expanded metal current collectors was evaluated, using LB1016 aqueous graphite dispersion to coat the current collectors in various locations. Electrodes were tested in half cells, flooded with an aqueous potassium hydroxide electrolyte, vs. a zinc reference electrode. The current was measured by applying a potentiodynamic scan of 1 mV/second and recording the observed current from OCV (about 1.4 volts) to 0.7 volt. The results were plotted on a polarization curve, with current density on the x-axis and voltage vs. zinc on the y-axis. Air convection was provided to the test electrodes so the test results would not be limited by the amount of air available to the electrode during the test. The limiting current (current at 1.05 V vs. zinc) was determined from the polarization curve. The average limiting current and the average maximum power (maximum power value from a graph of voltage vs. power on the test) are summarized in Table 1.

TABLE 1

| Graphite Coating Location | Limiting Current ($A/cm^2$ at 1.05 V) | | Maximum Power ($W/cm^2$) | |
|---|---|---|---|---|
| | 4Ni 5-060 P&L Expanded Metal | 3Ni 3.3-05 Expanded Metal | 4Ni 5-060 P&L Expanded Metal | 3Ni 3.3-05 Expanded Metal |
| None | 0.201 | 0.136 | 0.236 | 0.173 |
| Port Side | 0.218 | 0.138 | 0.249 | 0.169 |
| | (+8.5%) | (+1.5%) | (+5.5%) | (−2.3%) |
| Separator Side | 0.238 | 0.162 | 0.260 | 0.183 |
| | (+18.4%) | (+19.1%) | (+10.2%) | (+5.8%) |
| Both Sides | 0.220 | 0.148 | 0.248 | 0.170 |
| | (+9.5%) | (+8.8%) | (+5.1%) | (+1.7%) |

Adhesion of the catalytic material to the gold plated current collector was observed to be improved when a graphite coating was added over the gold plating, and there was generally a desirable increase in limiting current and maximum power with a graphite coating. While adhesion of the catalytic material appeared to be best when both sides of the current collector was coated with graphite, surprisingly the limiting current and the maximum power were better when only the separator side of the current collector was coated with graphite. In general, limiting current and maximum power were better with the 4 Ni 5-060 P&L expanded metal than with the 3 Ni 3.3-05 expanded metal.

Example 3

Eight lots of air electrodes were made using a catalytic sheet containing a manganese oxide catalyst and having a sheet of microporous PTFE film laminated to the port side of the catalytic sheet and a sheet of 4 Ni 5-060 P&L expanded metal embedded into the separator side of the catalytic sheet. The expanded metal sheet for Lot A was unplated and uncoated, but the expanded metal sheets for the other lots were plated with gold, coated with graphite or both before embedding in the catalytic sheet, as described in Example 2 and summarized in Table 2. Individual air electrodes for testing and assembly into cells were cut from the sheets of air electrodes. Poor adhesion of the catalytic material to the current collector was observed in some areas of the electrodes in Lot A and Lot B, in which there was no graphite coating on the current collector. Only electrodes which did not show visible signs of poor adhesion were used for subsequent testing and cell manufacturing.

Electrodes without a PTFE film layer were made from each current collector lot and tested for adhesion of the catalytic material to the current collector, using a pressure test in which a sample piece of electrode was mounting in a clamping device with a 0.635 cm (0.250 inch) opening on both sides of the sample and air pressure applied to the separator side of the electrode sample was gradually increased (at a rate of about 70.3 g/cm$^2$ (1 pound per square inch) per second), until there was an audible "pop" sound and the gauge pressure dropped to zero, indicating that the bond between the catalytic material and the current collector had broken. The results are summarized in Table 2. These results show that adhesion was substantially improved when the current collector is coated with graphite. Adhesion was best when both sides of the current collector were coated with graphite, but even coating just one side provided a significant improvement over uncoated current collectors, both with and without gold plating.

Electrodes were tested for alternating current (AC) impedance in half cells flooded with potassium hydroxide electrolyte solution vs. a zinc reference electrode, at open circuit potential, with a peak to peak alternating potential amplitude of 10 mV applied over a frequency range from 100 KHz to 0.1 Hz. The electrode impedance at 65 KHz is summarized in Table 2. Plating the current collector with gold generally resulted in lower electrode impedance, both with and without graphite coating. Gold plating and graphite coating of the current collector each resulted in a higher limiting current. However, when a gold plated current collector was coated on both sides with graphite, the improvement was not as great as with an uncoated, gold plated current collector. The best results were achieved with a gold plated current collector coated with graphite on only the separator side, so that a portion of the gold plating was in contact with the catalytic material.

Electrodes from each lot were tested in half cells flooded with aqueous potassium hydroxide electrolyte vs. a zinc reference electrode as described in Example 2. The results are summarized in Table 2. The results are similar to those for electrode impedance.

PP534 type prismatic zinc-air cells were made using electrodes from each lot. Negative electrodes containing zinc powder and the electrolyte was an aqueous potassium hydroxide solution.

Cells from each lot were tested for AC impedance in the same manner as described above for the half cells. The results (at 10 KHz rather than 65 KHz) are summarized in Table 2. As with the electrode impedance, cell impedance was also better when the current collector was gold plated, coated with graphite or both. However, a graphite coating over the gold plating did not necessarily result in higher impedance than with gold plating alone.

The limiting current of cells from each lot was determined using a polarization curve in the same manner as described above for the electrodes tested in half cells, except that air convection was not provided to the cells. The results are summarized in Table 2. Gold plating on the current collector only provided a substantial improvement in the cell limiting current unless a graphite coating was also applied over at least a portion of the current collector, and the combination of gold plating and graphite coating provided better results than a graphite coating without gold plating. The best results were achieved with both gold plating in combination with graphite coating on only the separator side of the current collector.

TABLE 2

|  | Lot No. | | | | | | | |
| --- | --- | --- | --- | --- | --- | --- | --- | --- |
|  | A | B | C | D | E | F | G | H |
| Gold Plating | none | yes | none | yes | yes | yes | yes | yes |
| Graphite Coating* | none | none | b | b | b | s | s | p |
| Electrode Adhesion (g/cm$^2$) | 492 | 422 | 3,234 | 2,180 | 2,180 | 1,617 | 1,617 | 1,758 |
| Electrode Impedance (ohms) | 0.366 | 0.299 | 0.371 | 0.299 | — | 0.298 | — | 0.368 |
| Electrode Limiting Current (mA/cm$^2$) | 273 | 389 | 296 | 352 | 380 | 379 | 411 | 312 |
| Cell Impedance (ohms) | 0.117 | 0.091 | 0.102 | 0.081 | 0.035 | 0.089 | 0.028 | 0.084 |
| Cell Limiting Current (mA/cm$^2$) | 52 | 52 | 68 | 77 | 125 | 75 | 135 | 51 |

*Note:
b = graphite coating on both sides of current collector
s = graphite coating on only the separator side of current collector
p = graphite coating on only the port side of the current collector In general it was concluded that in full cells a current collector plated with gold was beneficial, but only when at least a portion of the current collector was also coated with graphite to maintain good adhesion of the catalytic mixture to the current collector during both manufacturing of the air electrode and cell assembly. Good adhesion is also believed to provide resistance to hydraulic pressure during cell discharge, particularly at higher discharge rates where hydraulic pressure from the anode can be greater. It was also concluded that having a portion of the gold plating in contact with the catalytic mixture can be advantageous, particularly on the port side of the current collector (i.e., with only the separator side of the current collector coated with graphite).

Example 4

Additional experimentation was done with palladium rather than gold plating. Similar adhesion of the catalytic material to the plated portions of current collector was observed. Two additional lots of electrodes similar to those in Example 3 were made, except nano-manganese oxide catalyst was used. The electrodes in Lots I and J had current collectors with nickel expanded metal plated on both sides gold (Lot I) and palladium (Lot J) and then coated with graphite on the separator side of the current collectors. Electrodes from each lot were tested for limiting current by the same method described in Example 3. Electrodes from each lot were also assembled into cells, and the cells were tested for limiting current as described in Example 3. The results are summarized in Table 3. Electrodes and cells with palladium plated current collectors had limiting currents that were at least as high as electrodes and cells with gold plated current collectors.

TABLE 3

| | Lot I | Lot J |
|---|---|---|
| Electrode Limiting Current (mA/cm$^2$) | 381 | 395 |
| Cell Limiting Current (mA/cm$^2$) | 122 | 123 |

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising a catalytic electrode, a counter electrode, a separator disposed between the catalytic electrode and the counter electrode, and an aqueous alkaline electrolyte, all contained within a cell housing having one or more ports for the passage of a gas through the housing to or from the catalytic electrode, wherein:
   the catalytic electrode comprises a first side facing the separator, a second side opposite the first side and in fluid communication with the one or more ports, a catalytic layer comprising a catalytic material capable of reducing oxygen, and a porous current collector at least partially embedded in the catalytic material;
   the current collector has a first side corresponding to the first side of the catalytic electrode and a second side corresponding to the second side of the catalytic electrode; and
   the current collector comprises a substrate with an electrically conductive protective metal surface layer in contact with the catalytic material on one of the first side and the second side and a coating including a binder and electrically conductive particles in contact with the catalytic material on the other of the first side and the second side.

2. The electrochemical cell according to claim 1, wherein the current collector is at least partially embedded in the catalytic material on the first surface of the catalytic electrode.

3. The electrochemical cell according to claim 1, wherein the protective metal surface layer is in contact with the catalytic material on the second side of the current collector and the coating is in contact with the catalytic material on the first side of the current collector.

4. The electrochemical cell according to claim 1, wherein the protective metal surface layer is present on essentially the entire first side and essentially the entire second side of the current collector.

5. The electrochemical cell according to claim 2, wherein the protective metal surface layer is a distinct layer with a different composition than a portion of the substrate beneath the metal surface layer.

6. The electrochemical cell according to claim 1, wherein the protective metal surface layer comprises at least one member of the group consisting of gold, platinum, palladium and silver.

7. The electrochemical cell according to claim 1, wherein the protective metal surface layer comprises gold.

8. The electrochemical cell according to claim 1, wherein the binder comprises a polymeric material.

9. The electrochemical cell according to claim 8, wherein the polymeric material is at least one member of the group consisting of a fluoropolymer and a polyvinyl alcohol.

10. The electrochemical cell according to claim 1, wherein the electrically conductive particles comprise at least one member of the group consisting of carbon particles, gold particles, nickel particles and silver particles.

11. The electrochemical cell according to claim 10, wherein the electrically conductive particles comprise at least one member of the group consisting of graphite particles and carbon black particles.

12. The electrochemical cell according to claim 1, wherein the catalytic material comprises at least one member selected from the group consisting of a manganese oxide, an activated carbon, platinum, palladium, a cobalt oxide, a nickel oxide and an organic macrocyclic compound.

13. The electrochemical cell according to claim 12, wherein the catalytic material comprises at least one member selected from the group consisting of a manganese oxide and an activated carbon.

14. The electrochemical cell according to claim 1, wherein the electrolyte comprises one or both of potassium hydroxide and sodium hydroxide.

15. The electrochemical cell according to claim 1, wherein the catalytic electrode is an oxygen reduction electrode for reducing oxygen from outside the cell housing.

16. The electrochemical cell according to claim 15, wherein the cell is a metal-air cell, the catalytic electrode is a positive electrode, and the counter electrode is a negative electrode comprising a metal as an active material.

17. The electrochemical cell according to claim 16, wherein the active material of the negative electrode comprises zinc or an alloy of zinc.

18. The electrochemical cell according to claim 15, wherein the cell is a fuel cell.

* * * * *